US006554555B2

(12) United States Patent
Imahigashi

(10) Patent No.: US 6,554,555 B2
(45) Date of Patent: Apr. 29, 2003

(54) ANTENNA-MOUNTING NUT

(75) Inventor: Hirotsugu Imahigashi, Warabi (JP)

(73) Assignee: Nippon Antena Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/890,783

(22) PCT Filed: Dec. 1, 2000

(86) PCT No.: PCT/JP00/08527

§ 371 (c)(1), (2), (4) Date: Nov. 13, 2001

(87) PCT Pub. No.: WO01/43226

PCT Pub. Date: Jun. 14, 2001

(65) Prior Publication Data

US 2002/0136617 A1 Sep. 26, 2002

(30) Foreign Application Priority Data

Dec. 7, 1999 (JP) ........................................... 11/347268

(51) Int. Cl.[7] ................................................ F16B 39/24
(52) U.S. Cl. ...................... 411/533; 411/544; 411/149; 411/163
(58) Field of Search ................................ 411/544, 533, 411/163, 160, 149, 150, 186, 187, 188

(56) References Cited

U.S. PATENT DOCUMENTS 2,297,957 A * 10/1942 Hanneman
2,675,044 A * 4/1954 Poupitch
5,618,145 A * 4/1997 Kuo
5,897,277 A * 4/1999 Barre

FOREIGN PATENT DOCUMENTS

| | | |
|---|---|---|
| JP | 08-237014 | 9/1996 |
| JP | 10-084207 | 3/1998 |
| JP | 11-274825 | 10/1999 |

* cited by examiner

*Primary Examiner*—Flemming Saether
(74) *Attorney, Agent, or Firm*—Connolly Bove Lodge Hutz LLP

(57) ABSTRACT

With the object of obtaining a reliable grounding of the antenna, even if the panel of the vehicle is deformed or the elasticity of the base pad or O-ring weakens, a washer portion 21 is integrally secured to a nut portion 20 via a wave washer 22. This securing is performed by mounting a joint portion 23 in washer portion 21, and by mating protuberances 23*e* of second protruding pieces 23*d* of joint portion 23 with a ring-shaped groove portion 20*b* that is formed inside a first through-hole 20*a* of nut portion 20. Even if the vehicle panel the antenna is mounted, and so forth, is deformed, or the stress on the antenna-mounting nut 6 weakens, this change is absorbed by wave washer 22, and thus a marked reduction in the press-contacting force of the antenna-mounting nut 6 does not occur, and the grounding of same is made reliable.

2 Claims, 8 Drawing Sheets

ANTENNA-MOUNTING NUT

TECHNICAL FIELD

The present invention relates to an antenna-mounting nut for securing an antenna body, which comprises an antenna element, to a vehicle.

BACKGROUND ART

Motor vehicle antennas, which are secured to a panel of a vehicle, are conventionally known. An example of a constitution of a motor vehicle antenna of this kind is shown in FIG. 6. This motor vehicle antenna, with the part that is mounted on the vehicle panel enlarged, is also shown in FIG. 7.

As shown in FIGS. 6 and 7, an antenna body 100 of an automobile antenna comprises an antenna cover 101 and an element portion 102 that is mounted on antenna cover 101, and a base 103 is secured to the lower end of antenna cover 101. A cylindrical protrusion 103*a* is formed on the lower face of this base 103 so as to protrude therefrom, as shown in FIG. 7, and antenna body 100 is secured by a mounting nut 106 threadedly engaging on this cylindrical protrusion 103*a*, such that a vehicle panel 110 is interposed therebetween. Here, the base portion of cylindrical protrusion 103*a* is formed as a rectangular protrusion, and a rectangular antenna-mounting hole is formed in vehicle panel 110, that enables this rectangular protrusion to be inserted therethrough.

Furthermore, an antenna top portion 102*a* of a diameter that is enlarged with respect to element portion 102 is provided at the upper end of element portion 102. The lower portion of element portion 102 is a molded portion 102*b* that is molded from a synthetic resin that is soft, such as a rubber. It is preferable for this molded portion 102*b* to be provided with an internal wave trap coil that is connected to the element.

Further, when the antenna is subjected to an external force, the soft molded portion 102*b* of the lower portion of element portion 102 prevents damage to element portion 102, by bending and absorbing the external force applied.

The electrical length from antenna top portion 102*a* of element portion 102 constituted in this way, to the base end portion of antenna body 100, is, for example, approximately one quarter of an FM radio band wavelength; and the electrical length from the base end portion to the lower end of the wave trap coil, is approximately one quarter of a mobile wireless telephone band wavelength. As a result, in addition to being resonant in a mobile wireless telephone band and the FM radio band, this motor vehicle antenna is capable of receiving radio waves in the AM radio band via the whole area of the antenna body 100.

Signals of this kind, which are transmitted and received by an element portion 102 are guided out by cables 107*a*, 107*b* that pass through cylindrical protrusion 103*a*. Cable 107*a* is a cable for a mobile wireless telephone and cable 107*b* is a cable for FM/AM radio.

When securing an antenna body 100 of this kind to a vehicle panel 110, the rectangular protrusion formed on base 103 is inserted into the rectangular antenna-mounting hole formed in vehicle panel 110, and mounting nut 106 is made to mate threadedly with cylindrical protrusion 103*a* that protrudes from this antenna-mounting hole, and mounting nut 106 is tightened. Antenna body 100 is thus secured such that vehicle panel 110 is interposed therebetween, as shown in FIG. 6.

Further, a base pad 104, which is constituted from a resin that is elastic, is mated with base 103, and an O-ring 105 is inserted so as to mate with cylindrical protrusion 103*a*. Cylindrical protrusion 103*a* is then inserted into the antenna-mounting hole. Through the action of this base pad 104 and O-ring 105, rainwater and so forth is prevented from penetrating vehicle panel 110.

Furthermore, mounting nut 106 is constituted from a washer portion of U-shaped cross-section 121 formed with triangular protuberances at the upper end thereof, and from a nut portion 120 that engages threadedly with cylindrical protrusion 103*a*. Further, when mounting nut 106 is fastened onto cylindrical protrusion 103*a*, triangular protuberances engage inside the rear face of vehicle panel 110 and base 103 is thus reliably grounded to vehicle panel 110.

Further, so that there is no damage to element portion 102, when collision is made with a rotating brush of a car wash, or the like, when washing the car in a car wash, or when contact is made with the ceiling of a garage or the like when the car is being parked therein, element portion 102 can be made to be removable from antenna cover 101.

The constitution of the above-mentioned mounting nut 106 that secures antenna body 100 to vehicle panel 110 is shown in detail in FIG. 8.

As shown in FIG. 8, a plurality of triangular protuberances 121*a* are formed at the upper end of washer portion of U-shaped cross-section 121, and washer portion 121 is caulked to nut portion 120 so as to be integral with nut portion 120. That is, a screw thread is formed in nut portion 120 that engages threadedly with cylindrical protrusion 103*a* of base 103, and a plurality of caulking pieces 120*a* are formed on the upper face of nut portion 120. Further, by placing washer portion 121 on the upper face of nut portion 120 and caulking caulking pieces 120*a* by means of a caulking tool, nut portion 120 and washer portion 121 are made integral. Here, since six caulking pieces 120*a* are provided and disposed in a hexagonal shape, washer portion 121 is capable of rotating with nut portion 120. For this reason, when nut portion 120 is fastened onto cylindrical protrusion 103*a*, triangular protuberances 121*a* of washer portion 121 rotate, causing stripping of the paint of vehicle panel 110, thus permitting a reliable grounding of base 103.

Problems are posed by the conventional motor vehicle antenna as described above, namely, that, when the vehicle panel where the antenna is mounted is deformed, the gap between mounting nut 106 and vehicle panel 110 changes fractionally, and there is a risk of the press-contacting force of mounting nut 106 weakening. When the press-contacting force of mounting nut 106 weakens in this way, the electrical connection between washer portion 121 and vehicle panel 110 becomes unstable, the grounding becomes unreliable, and a grating sound results.

Additionally, since stress is continually applied to base pad 104 and O-ring 105 by the fastening strength of mounting nut 106, there is a risk that, over the years, the elasticity of base pad 104 and O-ring 105 will weaken under this stress. Similarly here, there is the problem that the press-contacting force of mounting nut 106 weakens, the grounding becomes unreliable, and a grating sound results.

It is therefore an object of the present invention to provide an antenna-mounting nut that is capable of providing the antenna with a reliable grounding, even if the vehicle panel is deformed or the elasticity of the base pad or O-ring should weaken.

DISCLOSURE OF THE INVENTION

In order to resolve the above-mentioned object, a first antenna-mounting nut of the present invention engages threadedly, from the reverse side of the above-mentioned vehicle panel, with the protrusion, on the antenna body, that is inserted into the mounting hole formed in the vehicle panel, and comprises a washer portion, at whose upper end a plurality of serrate protuberances is formed that come into contact with the above-mentioned vehicle panel; a nut portion that engages threadedly with the above-mentioned protrusion; and a joint portion that integrally secures, via a wave washer, the above-mentioned washer portion and above-mentioned nut portion so that same do not rotate with respect to one another, and is characterized in that inclined faces of the above-mentioned serrate protuberances are formed facing in the direction in which the above-mentioned nut portion is fastened onto the above-mentioned protrusion.

Further, a second antenna-mounting nut of the present invention, that is capable of resolving the above-mentioned object, engages threadedly, from the reverse side of the above-mentioned vehicle panel, with the protrusion, on the antenna body, that is inserted into the mounting hole formed in the vehicle panel, and comprises a washer portion, at whose upper end a plurality of serrate protuberances is formed that come into contact with the above-mentioned vehicle panel and whose inclined faces are formed facing in the direction in which the above-mentioned nut portion is fastened onto the above-mentioned protrusion; and a nut portion that is secured to this washer portion so as to be prevented from turning, and that engages threadedly with the above-mentioned protrusion, and is characterized in that the above-mentioned washer portion is made elastic by being formed from an elastic material and by a plurality of slits being formed radially therein.

According to a first present invention of this kind, a wave washer is interposed between the washer portion and nut portion, meaning that even if the vehicle panel is deformed or the elasticity of the base pad or O-ring weakens, this change can be absorbed by the wave washer, and thus a reduction in the press-contacting force of the antenna-mounting nut can be prevented as far as possible. Further, the inclined faces of the serrate protuberances that are formed at the upper end of the washer portion are formed facing in the direction in which the nut portion is fastened onto the protrusion of the base; thus, during fastening, the antenna-mounting nut rotates smoothly, and, during loosening, since the serrate protuberances engage inside the vehicle panel, the antenna-mounting nut can be prevented from becoming loose.

Further, according to a second present invention, since the washer portion is made elastic by being formed from an elastic material and by a plurality of slits being formed radially therein, even if the vehicle panel is deformed or the elasticity of the base pad or O-ring weakens, this change can be absorbed by the elastic washer portion, and thus a reduction in the press-contacting force of the antenna-mounting nut can be prevented as far as possible. Further, because the inclined faces of the serrate protuberances formed at the upper end of the washer portion are formed facing in the direction in which the nut portion is fastened onto the base protrusion, during fastening, the antenna-mounting nut rotates smoothly, and, during loosening, since the serrate protuberances engage inside the vehicle panel, the antenna-mounting nut can be prevented from becoming loose.

BEST MODE FOR CARRYING OUT THE INVENTION

Figure 6:
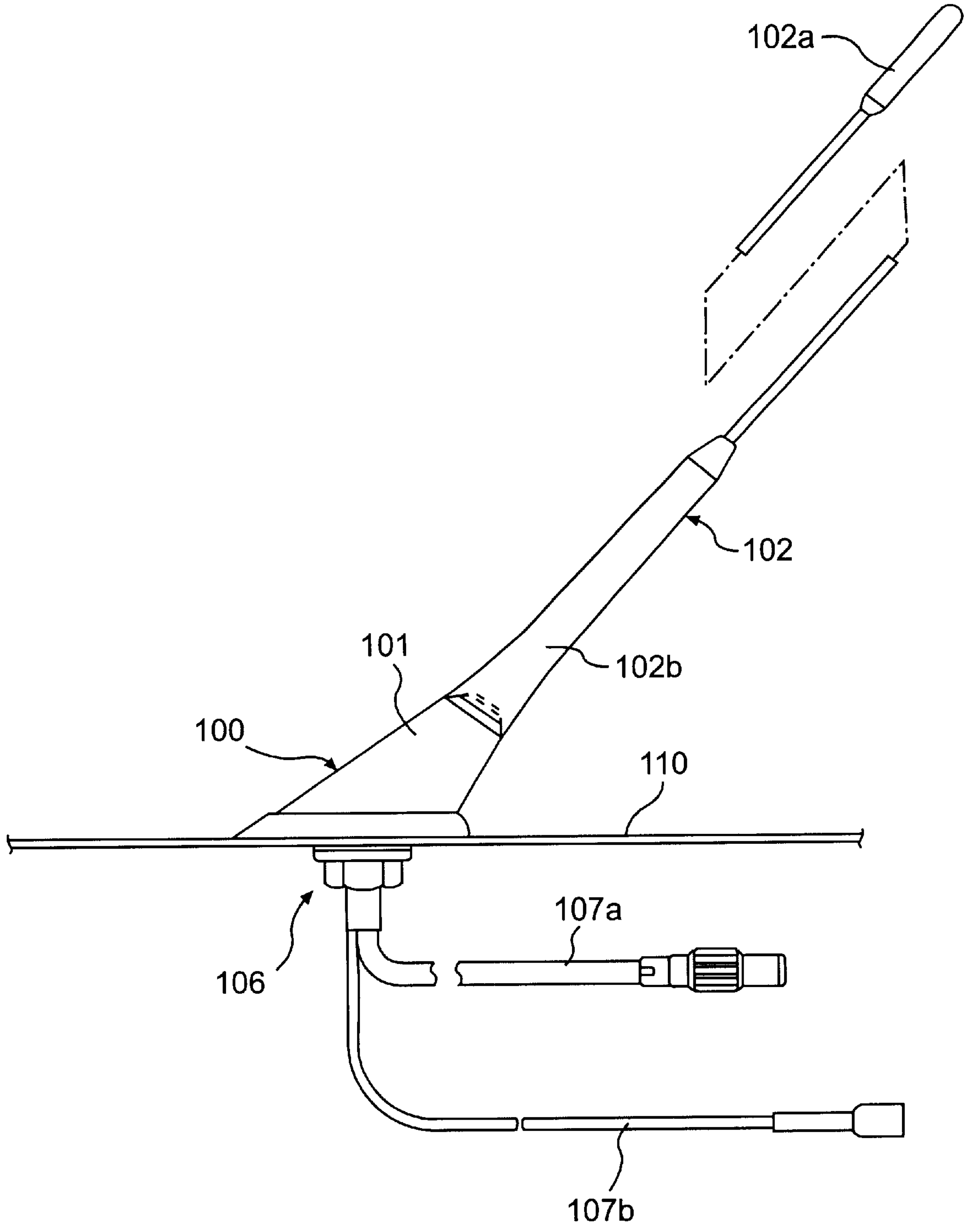
FIG. 6 PRIOR ART
FIG. 6 is a figure showing one example of a constitution of a conventional motor vehicle antenna.
Figure 7:
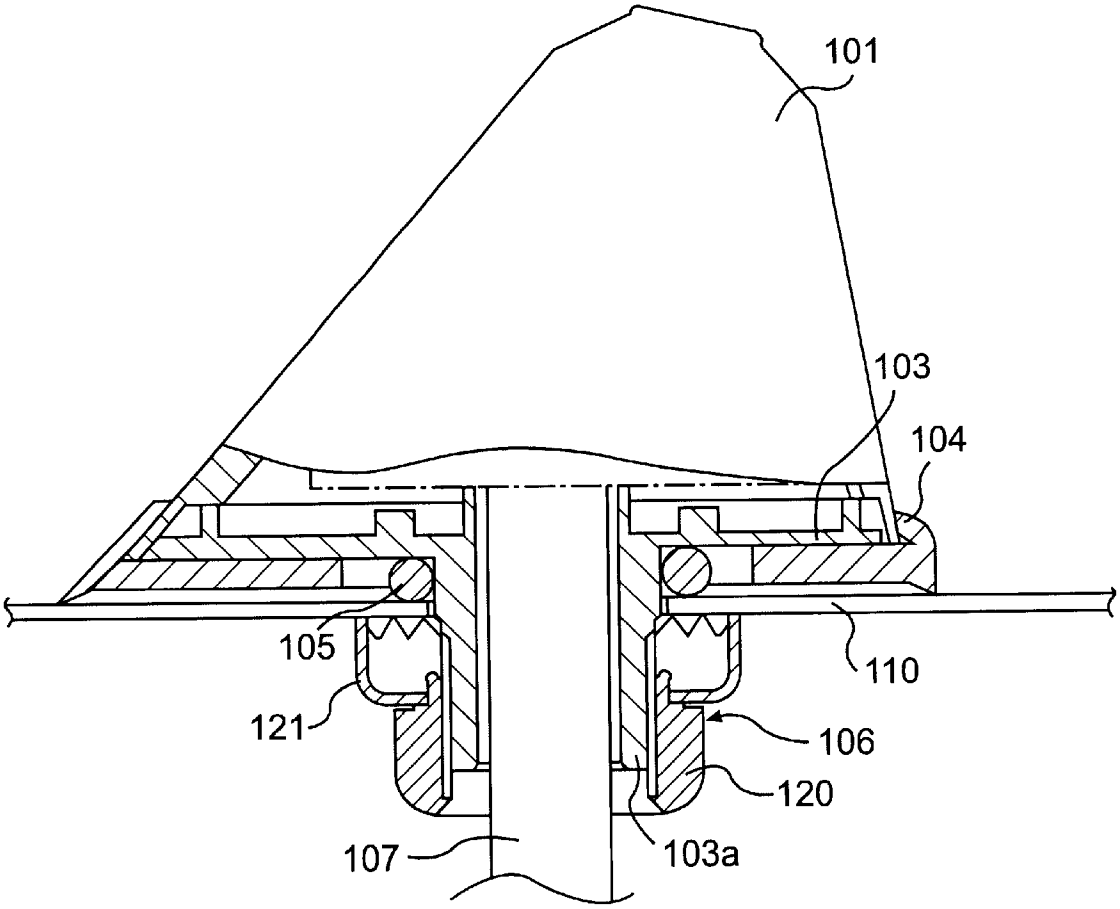
FIG. 7 PRIOR ART
FIG. 7 is a figure showing a conventional motor vehicle antenna with the part that is mounted on the vehicle panel enlarged.
Figure 8A:
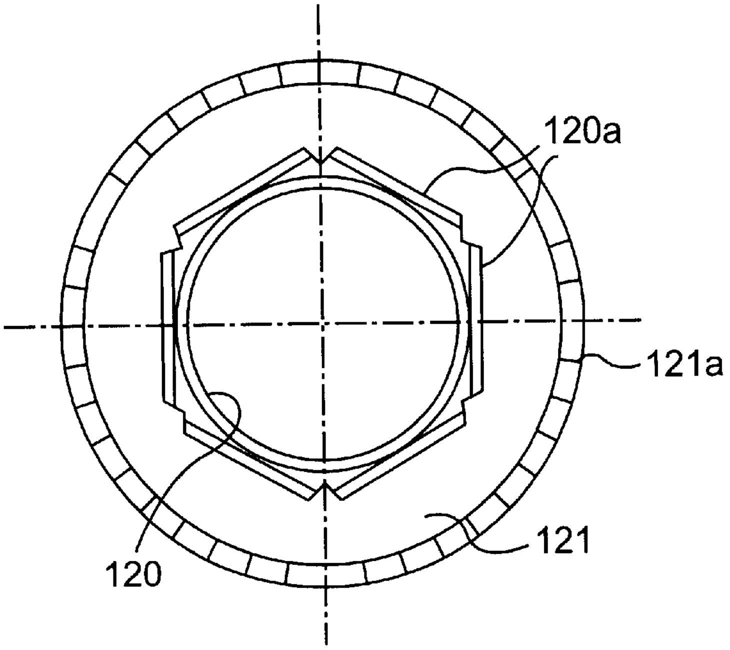
FIG. 8A PRIOR ART
FIG. 8 is a figure showing the constitution of a conventional mounting nut.
Figure 8B:
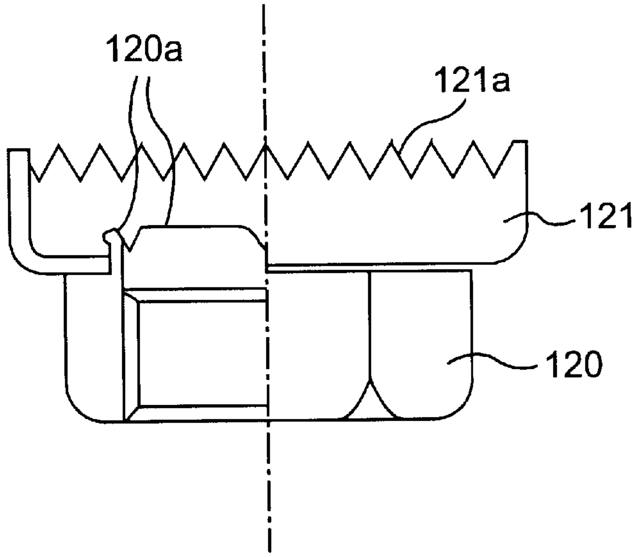
FIG. 8B PRIOR ART

The antenna-mounting nut according to the present invention attaches a motor vehicle antenna such that a panel of the vehicle is interposed therebetween, as shown in FIG. 6. Since constitutions excluding that of an antenna-mounting nut of a motor vehicle antenna are assumed to be similar, a description of each of such constitutions is omitted here in favor of the description of an antenna-mounting nut hereinbelow.

Figure 1:
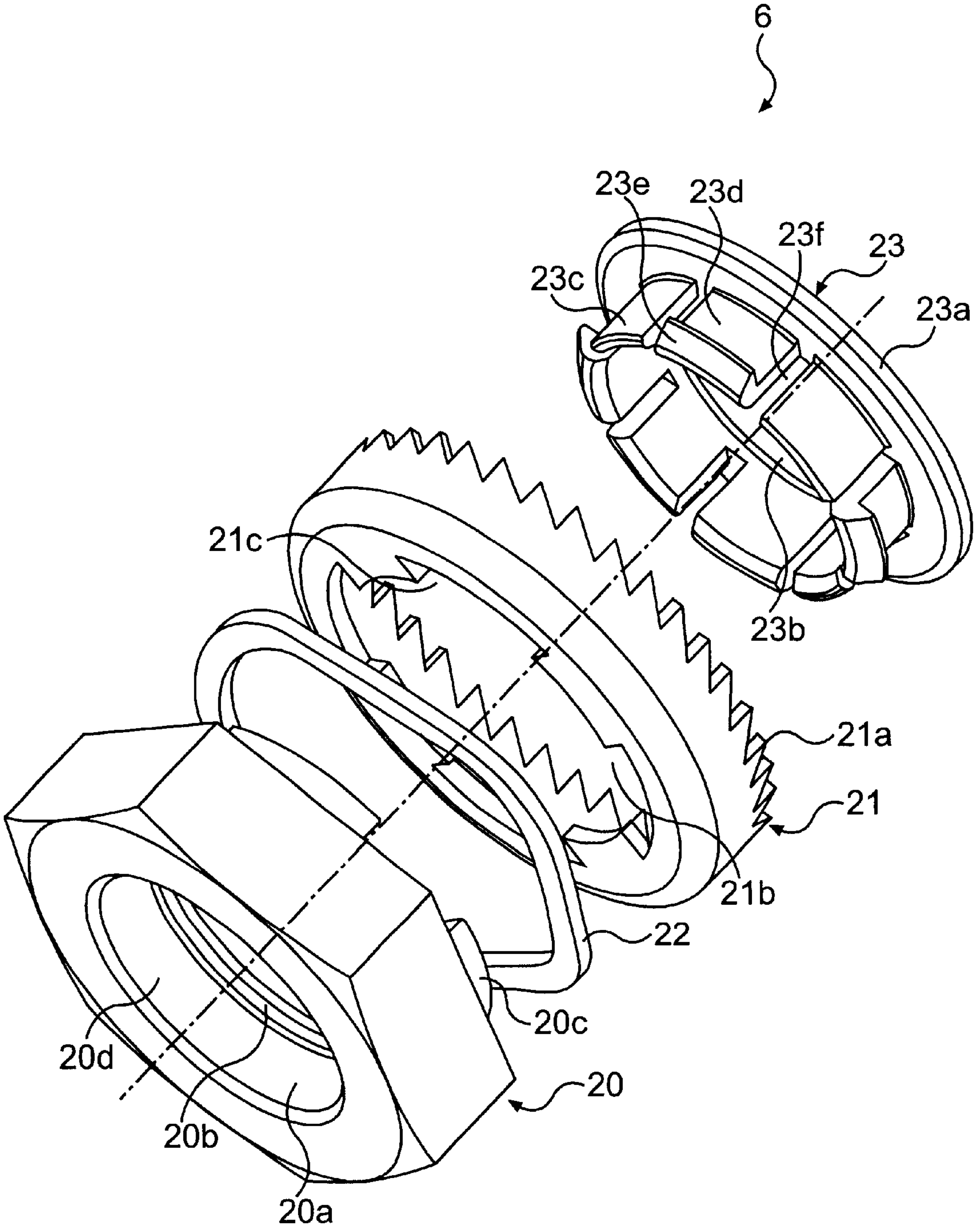
FIG. 1 is an exploded perspective view showing a constitution of a first antenna-mounting nut according to an embodiment of the present invention.
Figure 2:
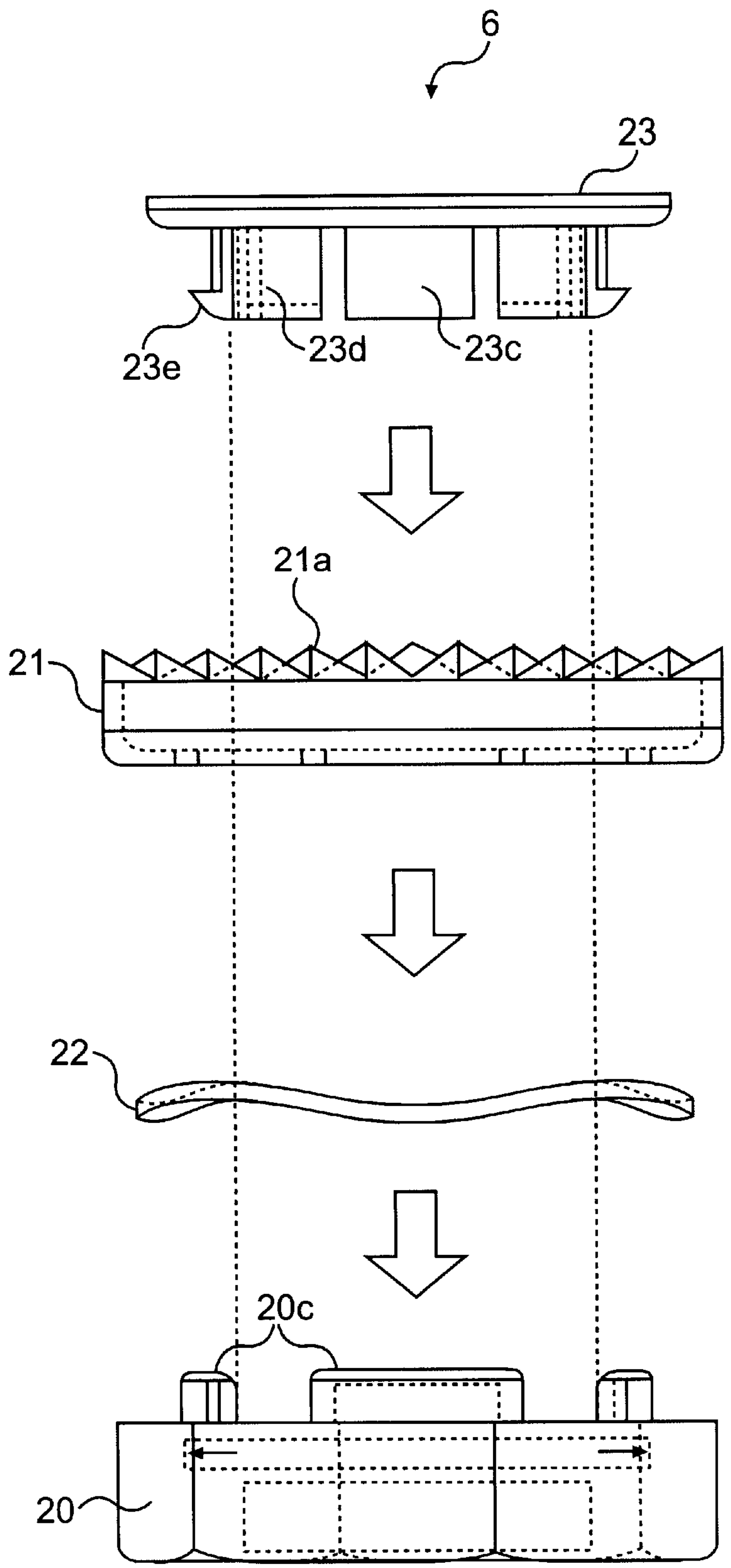
FIG. 2 is a figure showing the first antenna-mounting nut, according to an embodiment of the present invention, in a state of being assembled.
Figure 3A:
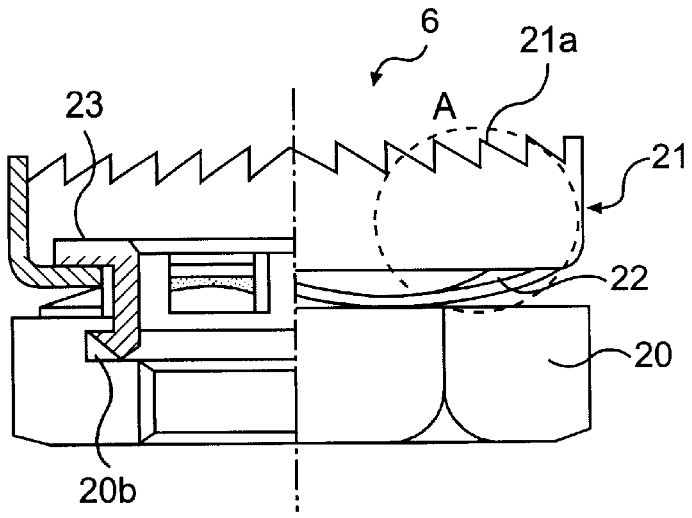
FIG. 3 is a figure showing a front view, a top view and a partial enlargement of the first antenna-mounting nut according to an embodiment of the present invention.
Figure 3B:
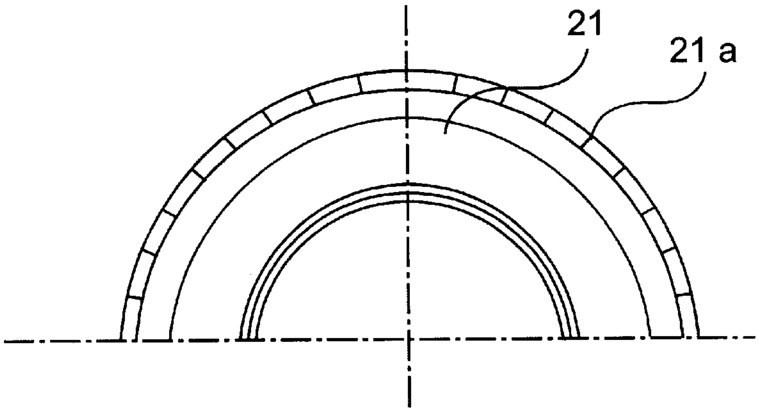
Figure 3C:
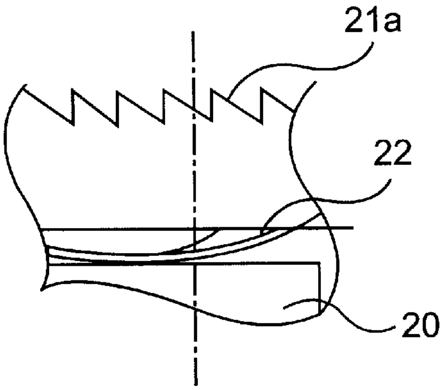

An example of the constitution of a first embodiment of the antenna-mounting nut of the present invention is shown in FIGS. 1 to 3.

FIG. 1 is an exploded perspective view showing the constitution of a first antenna-mounting nut according to an embodiment of the present invention; FIG. 2 is a figure showing the first antenna-mounting nut, according to the present invention, in a state of being assembled; FIG. 3(*a*) is a front view of the first antenna-mounting nut of the present invention, FIG. 3(*b*) is a top view thereof, and FIG. 3(*c*) is a figure showing a partial enlargement thereof.

As shown in these figures, the first antenna-mounting nut 6 of the present invention is constituted from a nut portion 20 that engages threadedly with a cylindrical protrusion 103*a* that protrudes from base 103; a washer portion 21 of U-shaped cross-section, on whose upper end edge a plurality of serrate protuberances 21*a* is formed; a wave washer 22, which has been deformed to assume a wave shape, that is interposed between nut portion 20 and washer portion 21; and a joint portion 23 that secures nut portion 20 and washer portion 21 such that wave washer 22 is interposed therebetween. A threaded portion 20*d* is formed, inside a first through-hole 20*a* in nut portion 20, that engages threadedly with a cylindrical protrusion 103*a* that protrudes from base 103, and a plurality of detent protuberances 20*c* is formed on the upper face of the nut portion so as to surround threaded portion 20*d*. Further, a ring-shaped groove portion 20*b* is formed at the top of first through-hole 20*a*.

Furthermore, washer portion 21 is formed so as to be of U-shaped cross-section, the upper end edge thereof having a plurality of serrate protuberances 21*a* formed thereon that engage inside vehicle panel 110, when the washer portion is mounted, a second through-hole 21*b* being formed in the center thereof. The inclined faces of serrate protuberances 21*a* are formed facing in the direction in which antenna-mounting nut 6 is fastened, and when antenna-mounting nut 6 is being fastened, serrate protuberances 21*a* slide over the surface of vehicle panel 110; conversely, when antenna-mounting nut 6 is being loosened, since serrate protuberances 21*a* engage inside the surface of vehicle panel 110, antenna-mounting nut 6 can be prevented from becoming loose by serrate protuberances 21*a*. A plurality of protuberance-mating portions 21*c* are formed so as to face inside second through-hole 21*b* of washer portion 21. Each of a plurality of detent protuberances 20*c* formed on nut portion 20 is caused to mate with these protuberance-mating portions 21*c*.

Furthermore, joint portion 23 comprises a ring-shaped collar portion 23*a* at the center thereof, in which a third through-hole 23*b* is formed; and a plurality of first protruding pieces 23*c* and second protruding pieces 23*d* that are formed on this collar portion 23*a* so as to protrude downwards from the circumference of the third through-hole 23*b*. Grooves 23*f* that extend as far as third through-hole 23*b* are formed between this plurality of first protruding pieces 23*c* and second protruding pieces 23*d*. Mating protuberances 23*e* that are tapered and that protrude outwards are also formed at the lower ends of each of second protruding pieces 23*d*.

Mating protuberances may also be provided at the lower ends of first protruding pieces 23*c*.

Hereinbelow, by referring to FIG. 2, a state of assembly will be described in which nut portion 20 and washer portion 21 are secured, by joint portion 23, such that wave washer 22 is interposed therebetween. During this assembly, first of all, wave washer 22 is placed on nut portion 20, whereon washer portion 21 is then placed. In this state, as shown in the figure, joint portion 23 is mounted inside washer portion 21. Thereupon, collar portion 23*a* of joint portion 23 is housed in washer portion 21, and the plurality of first protruding pieces 23*c* and second protruding pieces 23*d* of joint portion 23 are passed through second through-hole 21*b* of washer portion 21 and protrude downwards. Further, bypassing this plurality of first protruding pieces 23*c* and second protruding pieces 23*d* through wave washer 22, same are inserted into first through-hole 20*a* of nut portion 20. Thus, mating protuberances 23*e* of second protruding pieces 23*d* mate with ring-shaped groove portion 20*b* that is formed in first through-hole 20*a* of nut portion 20.

It is thus possible to secure nut portion 20 and washer portion 21 by means of joint portion 23 such that wave washer 22 is interposed therebetween. Further, at this stage, a plurality of detent protuberances 20*c* formed on nut portion 20 each mate with protuberance-mating portions 21*c* of washer portion 21, meaning that nut portion 20 and washer portion 21 rotate without slipping with respect to one another.

Figure 4:
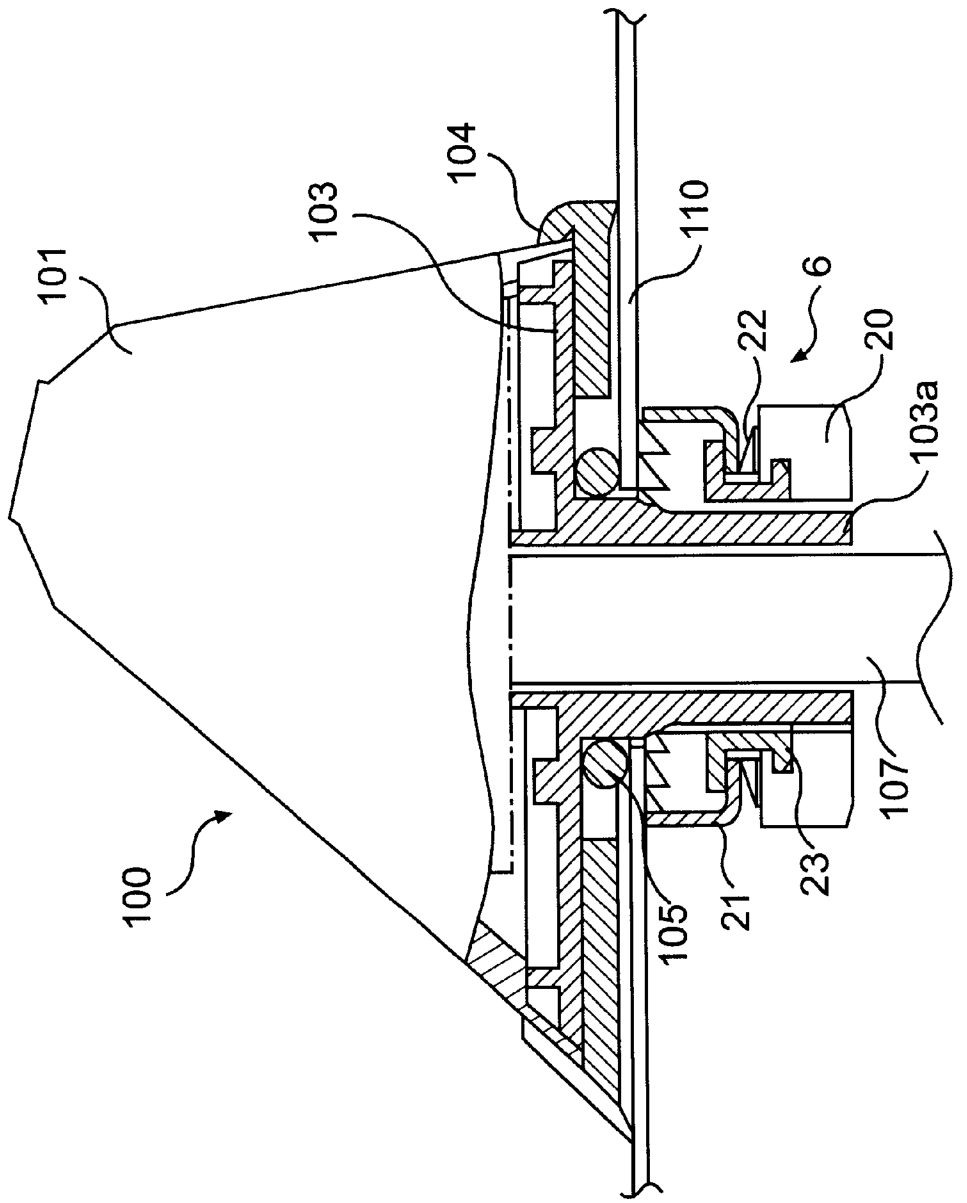
FIG. 4 is a figure showing a motor vehicle antenna mounted on a panel of a vehicle by means of the first antenna-mounting nut according to an embodiment of the present invention.

In FIG. 4, a motor vehicle antenna is shown mounted on a vehicle panel 110 by means of the first antenna-mounting nut 6 according to the present invention that has a constitution of the kind described above.

As shown in FIG. 4, the cylindrical protrusion 103*a* formed on base 103 on antenna body 100 is inserted into the rectangular antenna-mounting hole formed in vehicle panel 110, and antenna-mounting nut 6 according to the present invention is made to mate threadedly with cylindrical protrusion 103*a* that protrudes from this antenna-mounting hole, and antenna-mounting nut 6 is tightened. Antenna body 100 is thus secured such that vehicle panel 110 is interposed therebetween, as shown in FIG. 4.

A base pad 104, which is constituted from a resin that is elastic, is mated with base 103, and an O-ring 105 is inserted so as to mate with cylindrical protrusion 103*a*. Cylindrical protrusion 103*a* is then inserted into the antenna-mounting hole. This base pad 104 is glued to vehicle panel 110, and, by the action of ring 105, rainwater and so forth is prevented from penetrating vehicle panel 110 from the outside.

Further, antenna-mounting nut 6 is provided with a washer portion of U-shaped cross-section 21 formed with serrate protuberances 21*a* on the upper end edge thereof, and this washer portion 21 is constructed so as to rotate with nut portion 20. As a result, when antenna-mounting nut 6 is fastened onto cylindrical protrusion 103*a*, both nut portion 20 and washer portion 21 rotate, causing stripping of the paint on the rear surface of vehicle panel 110 by serrate protuberances 21*a* of [the washer portion]. Further, since serrate protuberances 21*a* engage inside the part of the vehicle panel from which paint has been stripped, the base 103 becomes reliably grounded to vehicle panel 110 via antenna-mounting nut 6.

When securing antenna body 100 to vehicle panel 110 by means of a first antenna-mounting nut 6 of this kind according to the present invention, when vehicle panel 110 is deformed, even if the gap between antenna-mounting nut 6 and vehicle panel 110 changes fractionally, this change can be absorbed by wave washer 22 that is interposed between nut portion 20 and washer portion 21, and thus a reduction in the press-contacting force of antenna-mounting nut 6 can be prevented as far as possible. It is thereby possible to stabilize the electrical connection between washer portion 21 and vehicle panel 110, and to prevent the grounding from becoming unreliable and the resulting grating sound.

Furthermore, even if the elasticity of base pad 104 and O-ring 105 weakens over the years, this change is similarly absorbed by wave washer 22, which is interposed between nut portion 20 and washer portion 21. As a result, it is possible to stabilize the electrical connection between washer portion 21 and vehicle panel 110, and to prevent the grounding from becoming unreliable and the resulting grating sound.

In addition, the inclined faces of the serrate protuberances 21*a* described above are formed facing in the direction in which antenna-mounting nut 6 is fastened, and when antenna-mounting nut 6 is being fastened, serrate protuberances 21*a* slide over the surface of vehicle panel 110; conversely, when antenna-mounting nut 6 is being loosened, since serrate protuberances 21*a* engage inside the surface of the vehicle panel, antenna-mounting nut 6 can be prevented from becoming loose by serrate protuberances 21*a*.

Figure 5A:
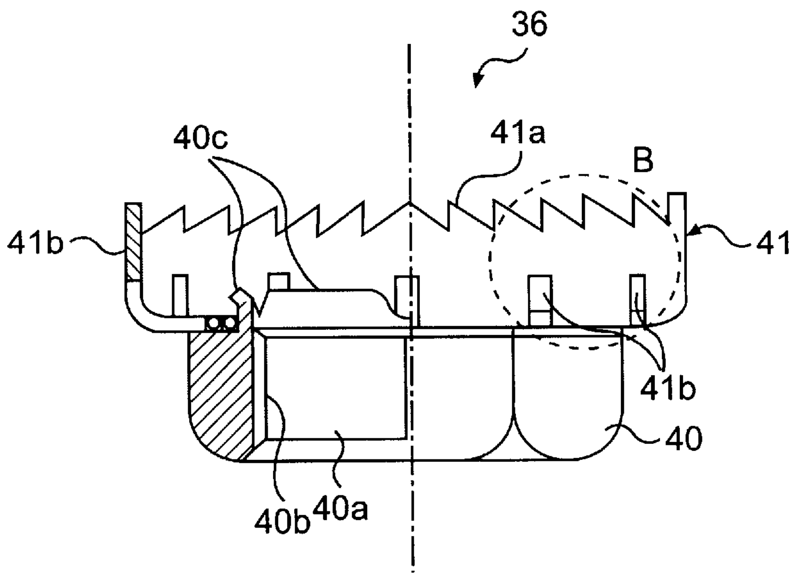
FIG. 5 is a figure showing a front view, a top view and a partial enlargement of a second antenna-mounting nut according to an embodiment of the present invention.
Figure 5B:
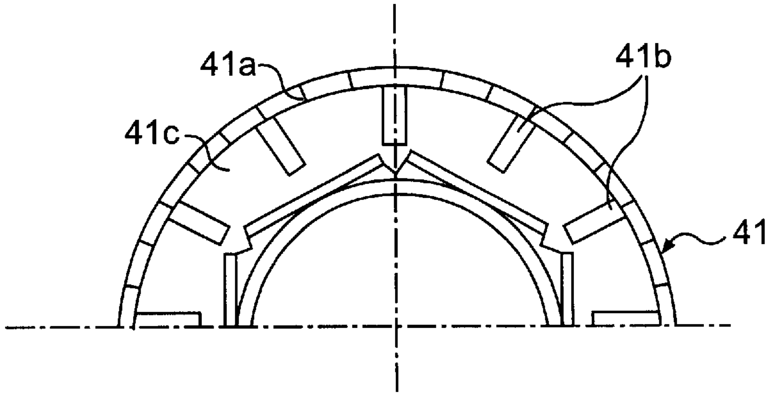
Figure 5C:
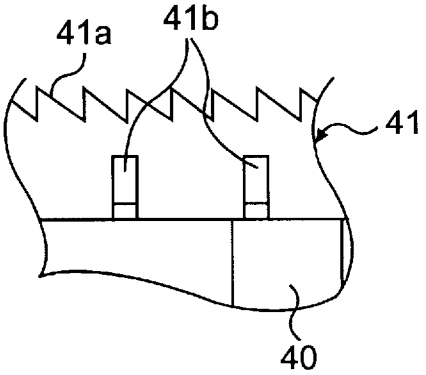

Next, an example of the constitution of a second embodiment of the antenna-mounting nut of the present invention is shown in FIG. 5. FIG. 5(*a*) is a front view showing a cross-section through the middle of a second antenna-mounting nut of the present invention; FIG. 5(*b*) is a top view thereof, and FIG. 5(*c*) is a figure showing a partial enlargement thereof.

As shown in these figures, a second antenna-mounting nut 36 of the present invention is constituted from a nut portion 40 that engages threadedly with a cylindrical protrusion 103*a* that protrudes from base 103; and a washer portion 41 of U-shaped cross-section, on whose upper end edge a plurality of serrate protuberances 41*a* and a plurality of radial slits 41*b* are formed. A threaded portion 40*b* is formed, inside a first through-hole 40*a* in nut portion 40, that engages threadedly with a cylindrical protrusion 103*a* that protrudes from base 103, and a plurality of caulking pieces 40*c* are formed on the upper face of nut portion 40 so as to surround threaded portion 40*b*.

Furthermore, washer portion 41 is formed so as to be of U-shaped cross-section, the upper end edge thereof having a plurality of serrate protuberances 41*a* formed thereon that engage inside vehicle panel 110, when the washer portion is mounted, a second polygonal through-hole being formed in the center thereof. The inclined faces of serrate protuberances 41*a* are formed facing in the direction in which antenna-mounting nut 36 is fastened, and when antenna-mounting nut 36 is being fastened, serrate protuberances 41*a* slide over the surface of the vehicle panel; conversely, when antenna-mounting nut 36 is being loosened, since serrate protuberances 41*a* engage inside the surface of vehicle panel 110, antenna-mounting nut 36 can be prevented from becoming loose by serrate protuberances 41*a*. A plurality of radial slits 41*b* are also formed in washer portion 41. These slits 41*b* are formed so as to extend from the planar portion 41*c*, in which the polygonal second through-hole is formed, to an upright portion 41*d* on whose upper end edge serrate protuberances 41*a* are formed. Further, washer portion 41 is formed from an elastic material such as steel, for example. Washer portion 41 is thus constructed such that upright portion 41*d* is elastically connected to planar portion 41*c*.

A constitution, in which nut portion 40 and washer portion 41 are secured so as to be integral, will now be described. Six caulking pieces 40*c* are, for example, formed on the upper face of nut portion 40. Hence, when washer portion 41 is placed on the upper surface of nut portion 40, these six caulking pieces 40*c* are inserted matingly into the second through-hole that has been formed, for example, as a hexagon, in washer portion 41. When caulking the six caulking pieces 40*c* by means of a caulking tool, nut portion 40 is secured integrally to washer portion 41. Here, since six caulking pieces 40*c* are provided and inserted into the hexagonal second through-hole, washer portion 41 is able to rotate with nut portion 40. As a result, when nut portion 40 is fastened onto cylindrical protrusion 103*a*, serrate protuberances 41*a* of washer portion 41 also rotate, causing stripping of the paint of vehicle panel 110. Further, since serrate protuberances 41*a* engage inside the part of the vehicle panel from which paint has been stripped, base 103 becomes reliably grounded to vehicle panel 110 via antenna-mounting nut 36.

When securing antenna body 100 to vehicle panel 110 by means of a second antenna-mounting nut 36 of this kind according to the present invention, when vehicle panel 110 is deformed, even if the gap between antenna-mounting nut 36 and vehicle panel 110 changes fractionally, this change can be absorbed by washer portion 41 that is elastic and has slits 41*b* formed therein, and thus a reduction in the press-contacting force of the antenna-mounting nut 36 can be prevented as far as possible. It is thereby possible to stabilize the electrical connection between washer portion 41 and vehicle panel 110, and to prevent the grounding from becoming unreliable and the resulting grating sound.

Furthermore, even if the elasticity of base pad 104 and O-ring 105 weakens over the years, this change is similarly absorbed by washer portion 41. As a result, it is possible to stabilize the electrical connection between washer portion 41 and vehicle panel 110, and to prevent the grounding from becoming unreliable and the resulting grating sound.

INDUSTRIAL APPLICABILITY

On account of the constitution described above, with the first antenna-mounting nut, a wave washer is interposed between the washer portion and nut portion, meaning that even if the vehicle panel is deformed or the elasticity of the base pad or O-ring weakens, this change can be absorbed by the wave washer, and thus a reduction in the press-contacting force of the antenna-mounting nut can be prevented by the present invention as far as possible. Further, the inclined faces of the serrate protuberances that are formed on the upper end of the washer portion are formed facing in the direction in which the nut portion is fastened onto the protrusion of the base; thus, during fastening, the antenna-mounting nut rotates smoothly, and, during loosening, since the serrate protuberances engage inside the vehicle panel, the antenna-mounting nut can be prevented from becoming loose.

Further, with the second antenna-mounting nut, since the washer portion is made elastic by being formed from an elastic material and by a plurality of slits being formed radially therein, even if the vehicle panel is deformed or the elasticity of the base pad or O-ring weakens, this change can be absorbed by the elastic washer portion, and thus a reduction in the press-contacting force of the antenna-mounting nut can be prevented as far as possible. Further, because the inclined faces of the serrate protuberances formed at the upper end of the washer portion are formed facing in the direction in which the nut portion is fastened onto the base protrusion, during fastening the antenna-mounting nut rotates smoothly, and, during loosening, since the serrate protuberances engage inside the vehicle panel, the antenna-mounting nut can be prevented from becoming loose.

What is claimed is:

1. An antenna-mounting nut, that engages threadedly, from a reverse side of a vehicle panel, with a protrusion, on an antenna body, which is inserted into a mounting hole formed in said vehicle panel, comprising:

a washer portion, in which a through-hole formed with protuberance-mating portions is formed, and at whose upper end, of U-shaped cross-section, a plurality of serrate protuberances is formed that come into contact with said vehicle panel;

a nut portion, in whose inner peripheral surface a threaded portion and ring-shaped groove are formed that engage threadedly with said protrusion, and on which nut portion detent protuberances are formed so as to protrude from an upper surface thereof a joint portion having collar that has a plurality of protruding pieces formed so as to protrude from the circumference of a through-hole formed in the collar and at whose tips mating protuberances are formed; and a ring-shaped wave washer having a wave shape, and wherein said protuberance-mating portions on said washer portion are mated with said detent protuberances on said nut portion such that said wave washer is interposed therebetween, so that said washer portion and said nut portion do not rotate with respect to one another; said collar portion on said joint portion comes into contact with the upper surface of the inside of said washer portion, and said plurality of protruding pieces pass through said through-hole of said washer portion, said mating protuberances being thereby mated with said ring-shaped groove portion in said nut portion; said washer portion and said nut portion are secured by said joint portion; and the inclined faces of said serrate protuberances are formed facing in a direction in which said nut portion is fastened onto said protrusion.

2. The antenna-mounting nut according to claim 1 wherein said washer portion is formed so as to be elastic by being formed from an elastic material and by a plurality of slits being formed radially therein.

* * * * *